US011754785B2

(12) United States Patent
Pruessner et al.

(10) Patent No.: US 11,754,785 B2
(45) Date of Patent: Sep. 12, 2023

(54) METHODS AND APPARATUSES FOR OPTICAL MODE CONVERSION

(71) Applicant: The Government of the United States, as represented by the Secretary of the Navy, Washington, DC (US)

(72) Inventors: Marcel W. Pruessner, Chevy Chase, MD (US); Dmitry A. Kozak, Berwyn Heights, MD (US); Todd H. Stievater, Arlington, VA (US); Brian J. Roxworthy, Chevy Chase, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/408,051

(22) Filed: Aug. 20, 2021

(65) Prior Publication Data
US 2023/0055779 A1    Feb. 23, 2023

(51) Int. Cl.
*G02B 6/14* (2006.01)
*G02B 6/35* (2006.01)

(52) U.S. Cl.
CPC ............. *G02B 6/14* (2013.01); *G02B 6/3536* (2013.01)

(58) Field of Classification Search
CPC ................................ G02B 6/3536; G02B 6/14
See application file for complete search history.

(56) References Cited

U.S. PATENT DOCUMENTS 4,365,862 A * 12/1982 Terui ...................... G02F 1/315
385/16
6,212,314 B1 * 4/2001 Ford .................... G02B 6/3536
385/9
(Continued)

FOREIGN PATENT DOCUMENTS

CN         112946826 A  *  6/2021
WO     WO 2005/101115 A1 * 10/2005

OTHER PUBLICATIONS

S. Abdulla et al. Tuning a racetrack ring resonator by an integrated dielectric MEMS cantilever. Optics Express 19:17:15864-15878, Aug. 2011. (Year: 2011).*

*Primary Examiner* — Michael Stahl
(74) *Attorney, Agent, or Firm* — US Naval Research Laboratory

(57) ABSTRACT

Methods and apparatuses for mode conversion. An apparatus that includes a substrate, a first waveguide, a second waveguide, a micro-electro-mechanical systems (MEMS) perturber, and a controller is provided. The first waveguide is formed on the substrate includes: (i) an input section, (ii) a bend section, and (iii) an output section. The second waveguide is also formed on the substrate and is disposed adjacent to a portion of the input section of the first waveguide. A portion of the second waveguide is separated from the input section of the first waveguide by a coupling gap. The perturber is disposed above the first waveguide and configured to move between a first position that is distal from a surface of the input section of the first waveguide and a second position that is closer to the surface of the input section of the first waveguide than the second position. The controller is configured to control a movement of the perturber between the first position and the second position. When the perturber is in the first position, a mode effective refractive index of the first waveguide is lower than the (Continued)

mode effective refractive index of the first waveguide when the perturber is in the second position.

5 Claims, 15 Drawing Sheets

(56) References Cited

U.S. PATENT DOCUMENTS

| | | | | |
|---|---|---|---|---|
| 6,658,176 | B2* | 12/2003 | Amantea | G02B 6/12002 |
| | | | | 385/32 |
| 6,879,751 | B2* | 4/2005 | Deliwala | G02B 6/3536 |
| | | | | 385/25 |
| 7,043,115 | B2* | 5/2006 | Frick | G02B 6/1225 |
| | | | | 333/219.1 |
| 10,031,354 | B2* | 7/2018 | Vo | G02F 1/025 |
| 10,823,913 | B1* | 11/2020 | Moebius | G02B 6/3552 |
| 10,976,493 | B2* | 4/2021 | Huang | G02B 6/12033 |
| 2019/0154921 | A1* | 5/2019 | Xing | G02B 6/3502 |
| 2019/0226847 | A1* | 7/2019 | Scheirich | G01P 15/093 |

* cited by examiner

METHODS AND APPARATUSES FOR OPTICAL MODE CONVERSION

BACKGROUND

Field of the Invention

The present application relates generally to methods and apparatuses for optical mode conversion using photonic integrated circuit (PIC) technology.

Description of Related Art

Fiber-optic communications have unlocked a new era in communications. Fiber optic communications is premised on the ability to transmit information using light transmitted through an optical medium. To increase the bandwidth in fiber-optic communications, multiplexing techniques have been introduced. One type of multiplexing is wavelength-division multiplexing (WDM) where multiple laser signals, each with a unique wavelength, are transmitted through a single optical fiber. Another type of multiplexing is called mode-division multiplexing (MDM) where a single wavelength laser is used to populate multiple orthogonal fiber modes that each carry a unique information signal. While optical communication is generally thought to involve a long optical fiber through which the optical carrier travels, that picture only describes one area of long haul fiber optical communication. Recently, there has been a considerable push to miniaturize optical devices and systems by developing photonic integrated circuits (PICs); i.e. integrated circuits that use light instead of electricity as the information carrier. Thus, chip-scale MDM is a current area of interest. However, to date, most chip-scale MDM devices have only demonstrated fixed conversion between different order optical modes (e.g., $TE_0$ to $TE_1$) or have only enabled ON/OFF switching of mode converters. This limits the wavelength of operation since mode conversion and switching are generally wavelength-sensitive. Thus, there is a need for dynamic devices in which any mode can be converted to any higher or lower order mode. (e.g., $TE_0$ to $TE_1$ or $TE_1$ to $TE_0$). This would enable mode conversion over multiple wavelengths while simultaneously reducing the area required for optical devices for mode converters.

SUMMARY OF THE INVENTION

One or more the above limitations may be diminished by structures and methods described herein.

In one embodiment, an apparatus is provided. The apparatus includes a substrate, a first waveguide, a second waveguide, a perturber, and a controller. The first waveguide is formed on the substrate and includes: (i) an input section, (ii) a bend section, and (iii) an output section. The second waveguide is also formed on the substrate and is disposed adjacent to a portion of the input section of the first waveguide. A portion of the second waveguide is separated from the input section of the first waveguide by a coupling gap. The perturber is disposed above the first waveguide and configured to move between a first position that is distal from a surface of the input section of the first waveguide and a second position that is closer to the surface of the input section of the first waveguide than the second position. The controller is configured to control a movement of the perturber between the first position and the second position. When the perturber is in the first position, a mode effective refractive index of the first waveguide is lower than the mode effective refractive index of the first waveguide when the perturber is in the second position.

In another embodiment, a method of converting a mode of light is provided. An instruction to output light of a particular polarization mode is received at a controller. A perturber disposed above an input section of first waveguide, provided on a substrate, is caused by the controller to move to a position above the first waveguide so as to set a mode effective refractive index of the first waveguide. Light with a fundamental polarization mode is received at the input section of a first waveguide. Light with a higher order polarization mode, corresponding to the height of the perturber above the input section of the first waveguide is outputted from a second waveguide that is also formed on the substrate and disposed adjacent to a portion of the input section of the first waveguide such that a portion of the second waveguide is separated from the input section of the first waveguide by a coupling gap that allows optical coupling between the first waveguide and the second waveguide.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1A:
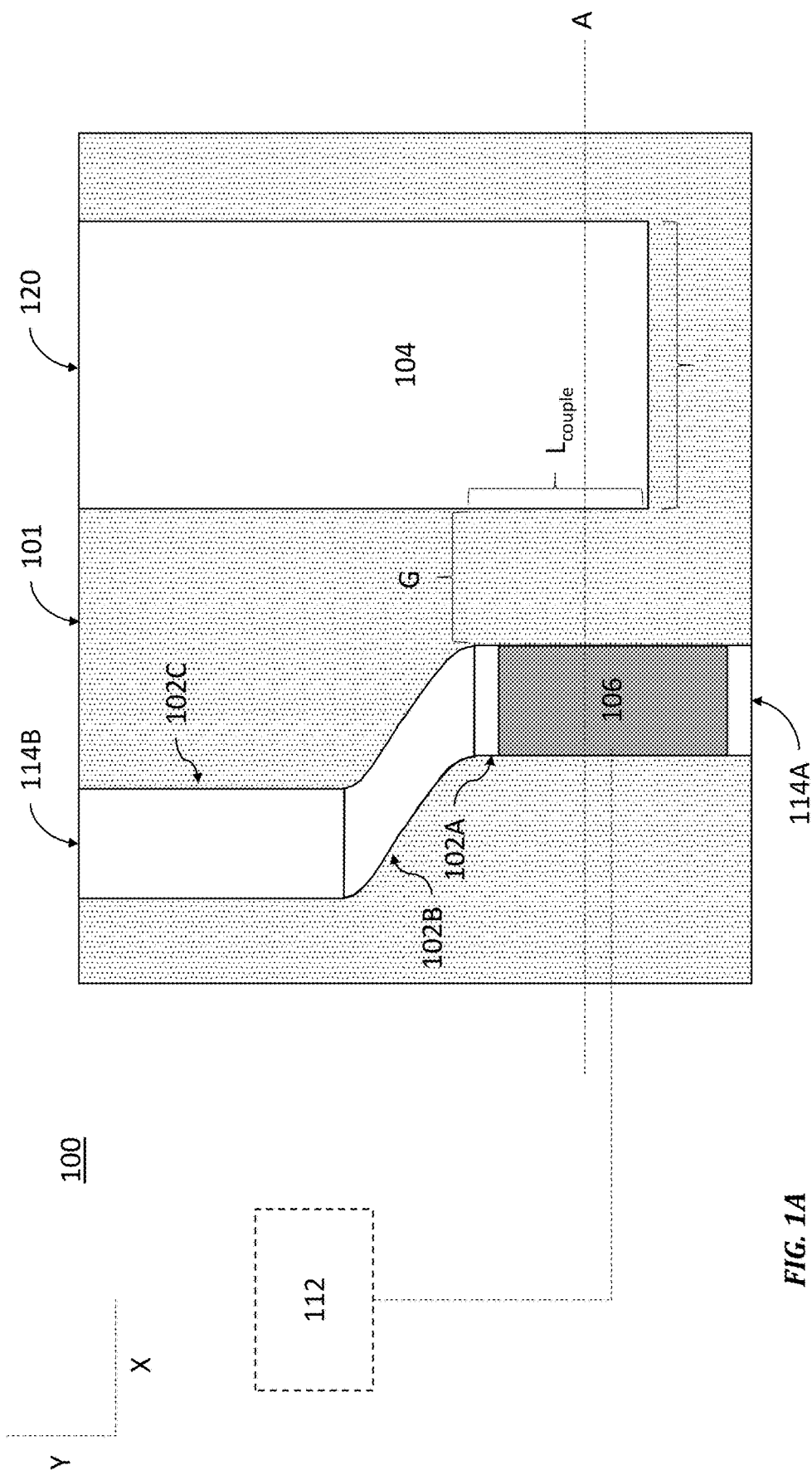
FIG. 1A is a plan schematic view of a photonic integrated circuit (PIC) according to one embodiment.

Different Figures may have at least some reference numerals that are the same in order to identify the same components, although a detailed description of each such component may not be provided below with respect to each Figure.

DETAILED DESCRIPTION OF THE PREFERRED EMBODIMENTS

Figure 1B:
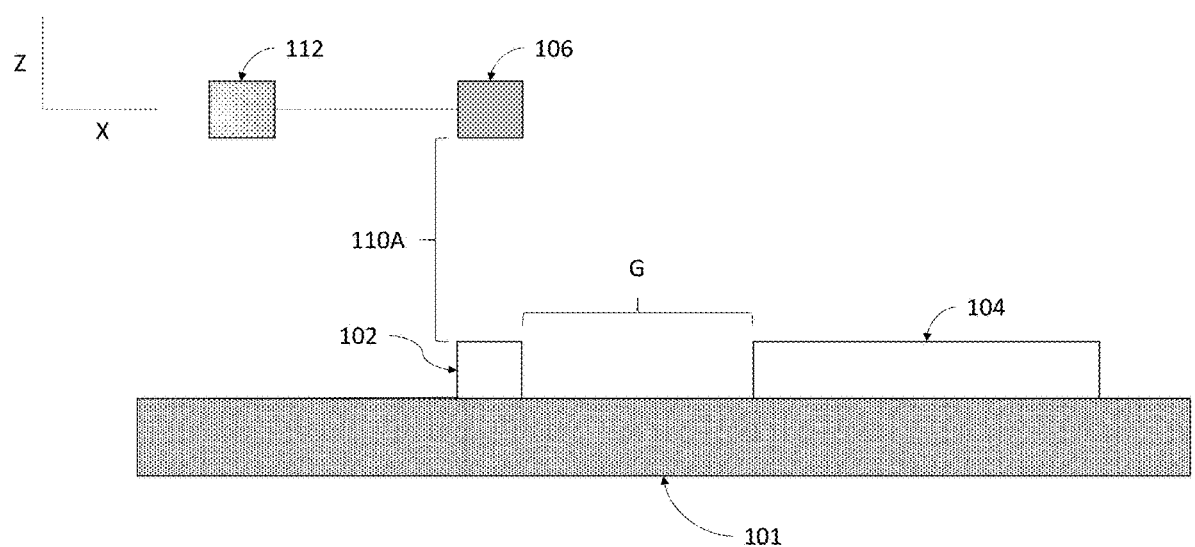
FIG. 1B is a cross-sectional view of PIC 100 taken along the line A in FIG. 1A.
Figure 1C:
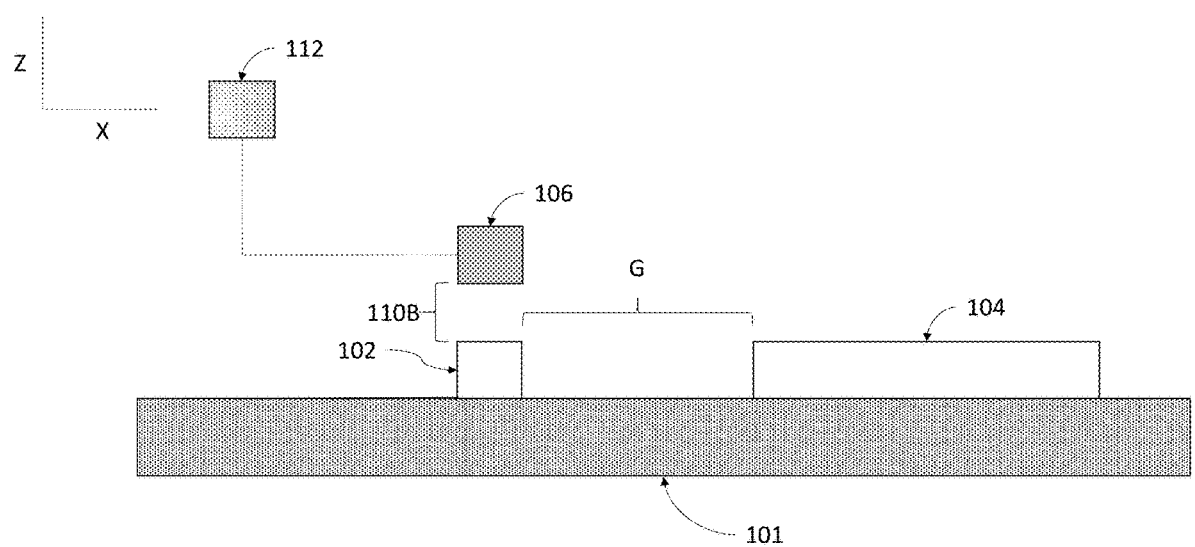
FIG. 1C is another cross-sectional view of PIC 100 taken along line A.

In accordance with example aspects described herein are photonic (or optical) integrated circuits (PICs) for mode conversion. FIG. 1A is a plan view of a PIC 100 according to one embodiment. FIG. 1B is a cross-sectional view of PIC 100 taken along the line A in FIG. 1A. FIG. 1C is another cross-sectional view of PIC 100 taken along line A. In FIG. 1C, a microelectromechanical system (MEMS) perturber 106 has been brought into closer proximity to optical waveguide 102 relative to FIG. 1B.

FIGS. 1A-C show a first optical waveguide 102 and a second optical waveguide 104 formed on a substrate 101. In a preferred embodiment, optical waveguides 102 and 104 comprise silicon nitride and the substrate 101 comprises silicon. However, as one of ordinary skill will appreciate, other optical materials could be used for substrate 101 and waveguides 102 and 104 with only a change in their respective dimensions and placement relative to each other. Exemplary materials that could be used for waveguides 102 and 104 includes: silicon on insulator (SOI), III-V semiconductors, or other common optical waveguide materials. In the exemplary embodiment shown in FIGS. 1A-1C, the thicknesses of waveguides 102 and 104 are both 175 nm. However, that value is merely exemplary. The thicknesses of waveguides 102 and 104 may be different, but both are preferably less than one optical wavelength thick. Of course, as one of ordinary skill will appreciate, the thicknesses of the waveguides 102 and 104 may also depend on the type of material that comprises waveguides 102 and 104 and their respective widths. Certain materials may have properties that call for different thicknesses than silicon nitride.

In the exemplary embodiment shown in FIG. 1A, a width of waveguide 102 in the x-direction is less than a width of waveguide 104 in the same direction over, at least, the length of an input section 102A. This arrangement is referred to as an asymmetric directional coupler. The width of waveguide 102 may also be less than a width of waveguide 104 over its entire length. The reason for this is explained in further detail below. Waveguide 102 may be divided into three sections: an input section 102A, a bend section 102B, and an output section 102C. The input section 102A includes an optical input 114 into which light is injected. The light may be injected into optical input 114 from a light source or, perhaps more commonly, from another component in the overall optical circuit. In a preferred embodiment, the light injected into the optical input 114A is laser light of a single wavelength. However, as explained below, the wavelength of the light injected into optical input 114A may change during operation, and such change may be accounted for by the motion of perturber 106. Thus, the range over which perturber 106 may be moved can be set to correspond to a desired range of wavelengths that may be injected into optical input 114A. For example, for silicon nitride waveguides the wavelength range may span the visible range to the near-infrared (NIR) range. If germanium-on-silicon waveguides are the range may extend into the long-wave IR, e.g. wavelengths greater than 10,000 nm. However, for simplicity, the following discussion will consider light of a fixed wavelength to be injected in input 114. An exemplary wavelength is approximately 1550 nm.

At least a portion of the input section 102A is in close proximity to a portion of waveguide 104. More specifically, over a length defined as the coupling length ($L_{couple}$), a portion of section 102A is separated from a portion of waveguide 104 by a coupling gap (G). In a preferred embodiment, G is less than the wavelength of light injected into the optical input 114A. By bringing waveguides 102 and 104 into close proximity over the coupling length, the evanescent field in waveguide 102 extends into waveguide 104 generating light of a certain polarization mode therein.

Figure 2:
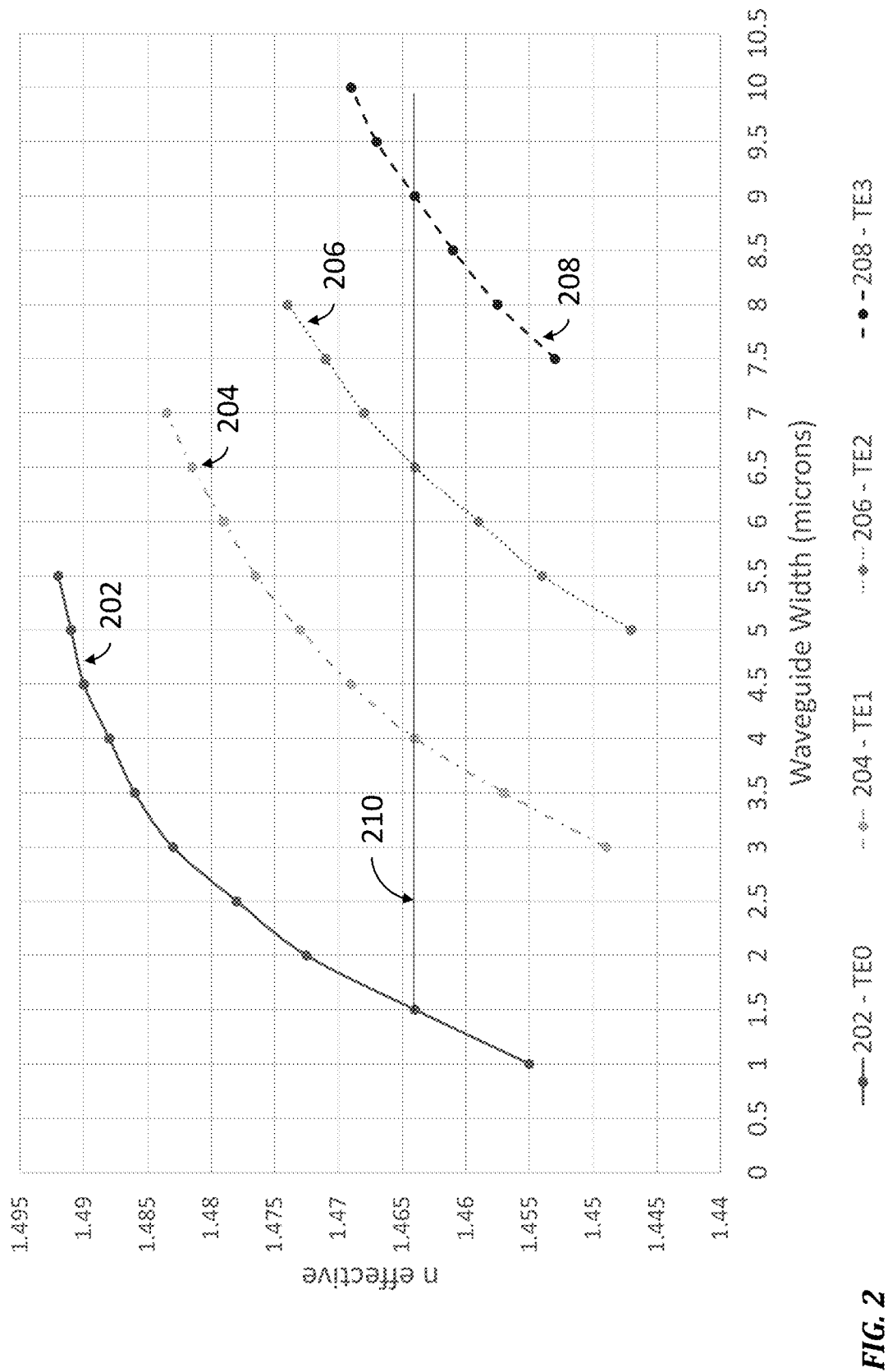
FIG. 2 is a plot of the mode effective refractive index versus waveguide width.

The mode conveyed within waveguides 102 and 104 is dependent upon two factors: (i) the widths of waveguides 102 and 104 and (ii) the mode effective refractive index ($n_{eff}$). As one of ordinary skill will appreciate, the mode effective index is a measure of how fast light travels within a waveguide. It is proportional to the refractive index of the material comprising the waveguide. If a waveguide comprises a high refractive index core and a lower refractive index core, then the effective index will have a value between the high and low index materials. The value will depend on the mode profile and how much of the mode resides in the high index vs. low index regions. FIG. 2 is a plot of the mode effective refractive index, $n_{eff}$, for a silicon nitride waveguide versus waveguide width for laser light with a wavelength of 1550 nm. Four plots 202, 204, 206, and 208 corresponding to modes $TE_0$, $TE_1$, $TE_2$, and $TE_3$, respectively, are shown. Using FIG. 2, the optical coupling between waveguides 102 and 104 will be explained below.

Consider an embodiment where the width of waveguide 102 is 1.5 microns and $n_{eff}$ for waveguide 102 is 1.464. If the width of waveguide 104 is 4 microns, then by FIG. 2 the fundamental mode $TE_0$ injected into waveguide 102 will be converted to mode $TE_1$ in waveguide 104 through optical coupling in the asymmetric directional coupler. In another embodiment, if the width of waveguide 102 is the same but the width of waveguide 104 is 6.5 microns, then the $TE_2$ mode will be excited in waveguide 104. This condition, where waveguides of different widths have the same $n_{eff}$, is called a phase matching condition. One exemplary phase matching condition is illustrated in FIG. 2 by line 210. Waveguides of widths 1, 4, 6.5, and 9 propagating modes $TE_0$, $TE_1$, $TE_2$, and $TE_3$, respectively, all correspond to a $n_{eff}$ of 1.464.

A couple other observations about FIG. 2 are noteworthy. First, the higher order modes TEN, where x>0, have a lower $n_{eff}$ compared to $TE_0$. In other words, plots 204, 206, and 208 are shifted down in the vertical (y) direction. Second, as the width of the waveguide increases, $n_{eff}$ increases for all modes. Thus, looking at the $TE_0$ mode as an example, $n_{eff}$ for a width of 1 micron is less than $n_{eff}$ for a width of 3 microns.

As one of ordinary skill will appreciate, once $n_{eff}$ and the widths of two waveguides are set, the type of mode conversion is set as well. Thus, in a conventional asymmetric coupler, if the waveguides are of widths 1.5 and 4 microns respectively, then 1550 nm $TE_0$ laser light injected into the smaller waveguide will result in $TE_1$ mode light outputted from the larger waveguide. However, PIC 100 includes a MEMS perturber 106 which is configured to move between a plurality of positions in the vertical (y) direction, as shown in FIGS. 1B and 1C. As discussed below, by moving MEMS perturber 106 between two (or more) positions, it is possible to dynamically control mode conversion.

In one embodiment, the MEMS perturber 106 is substantially the same as the perturber disclosed in U.S. patent application Ser. No. 14/538,831, now U.S. Pat. No. 9,395, 177, the contents of which are incorporated by reference in their entirety. In one embodiment, perturber 106 comprises silicon nitride (SiN$_x$) and has a thickness, in they direction in FIGS. 1B and 1C, of approximately 250 nm. Perturber 106 has a width, in the x direction in FIGS. 1B and 1C, that is, preferably, approximately the same as the width of waveguide 102. However, the width and thickness of the perturber 106 is flexible and can be changed without departing from the scope of the invention so long as the dimensions of perturber 106 do not prevent effective transmission of the light in the waveguides, which could happen if the perturber 106 is too thick.

Perturber 106 is constructed to move between a plurality of positions relative to waveguide 102. Perturber 106 may be moved through the plurality of positions by several mechanisms. First, perturber 106 may be moved through a plurality of positions by thermal actuators. As one of ordinary skill will appreciate, a thermal actuator takes advantage of the thermal coefficient of expansion of materials, i.e. they expand or contract with changes in temperature. Perturber 106 may be implemented as a bi-layer structure (or more than two layers) with different coefficients of thermal expansion. For example, a structure comprising a metal film and insulating dielectric (e.g., gold on silicon nitride). Heating the structure, under the control of controller 112 will cause the gold layer to expand more than the silicon nitride layer and the beam will curve correspondingly. By arranging the different layers, one may control the displacement. For example, a cantilever forming perturber 106 comprising a gold-silicon nitride composite with the gold (metal) layer on top and the silicon nitride layer on the bottom will result in a downward curvature such that the free end of the cantilever is displaced downward. Alternatively, the position of perturber 106 may be adjusted using electrostatic or gradient electric force actuation under the control of controller 112, as described in "Broadband opto-electromechanical effective refractive index tuning on a chip" by Pruessner et al., published in Optics Express, vol. 24, pp. 1391-13930, the contents of which are incorporated by reference herein in their entirety. It should also be noted that, in addition to the technique described below, the effective index can be tuned by using the thermo-optic effect.

Figure 3:
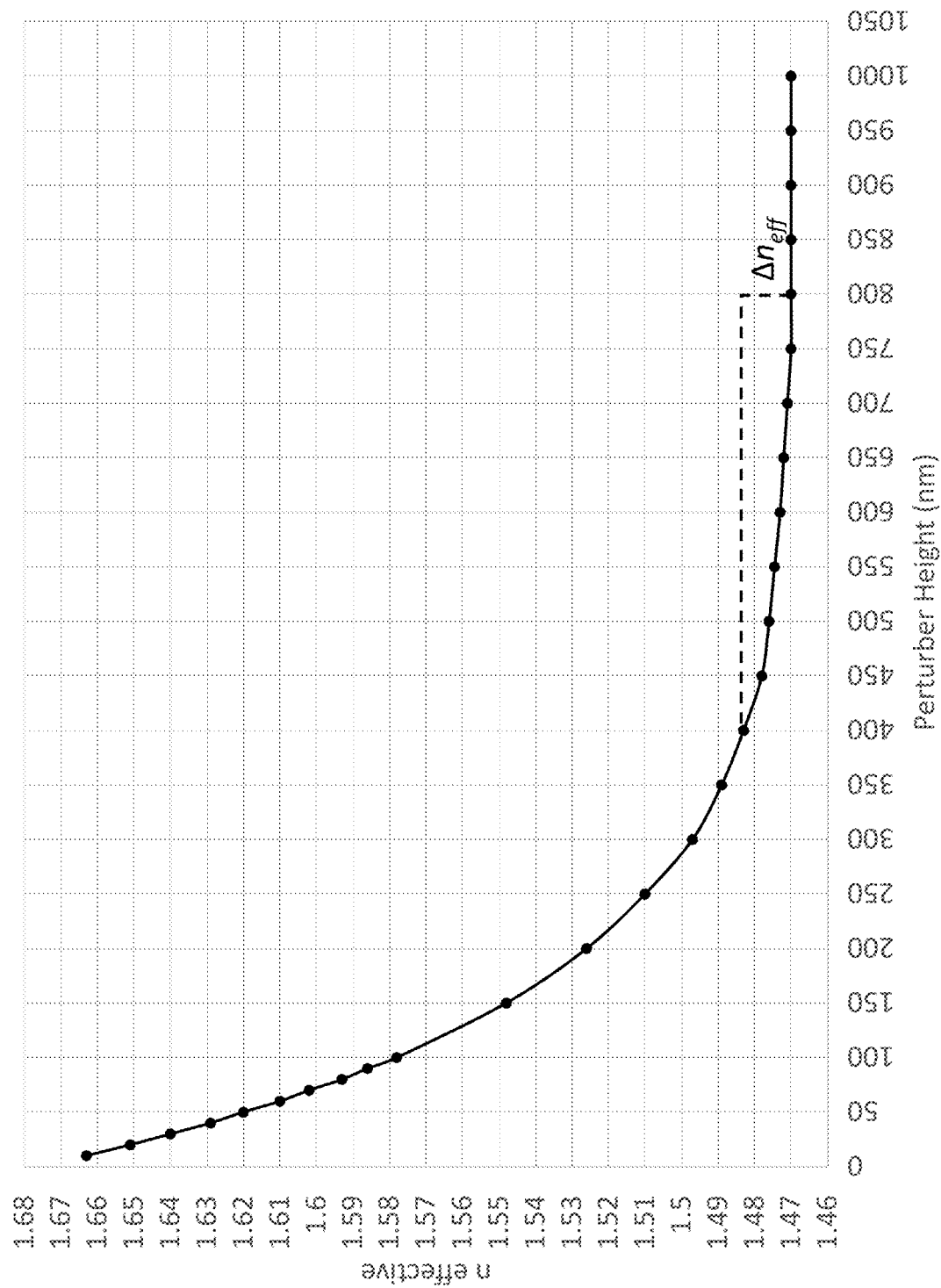
FIG. 3 is a plot of the mode effective refractive index for a waveguide as a function of the distance from a top surface of waveguide to a bottom surface of perturber.

In a first position, distal from a top surface of waveguide 102, perturber 106 has little or no effect on $n_{eff}$ of waveguide 102. However, as perturber 106 is brought closer to the top surface of waveguide 102, a corresponding change in $n_{eff}$ occurs, as shown in FIG. 3. FIG. 3 is a plot of $n_{eff}$ for waveguide 102 as a function of the distance from a top surface of waveguide 102 to a bottom surface of perturber 106 (hereinafter the "perturber height"). As can be seen in FIG. 3, as the perturber height decreases, i.e., perturber 106 is brought closer to waveguide 102, $n_{eff}$ increases. For example, if perturber 106 is held in a distal position, equal to or greater than 800 nm from waveguide 102, $n_{eff}$ is approximately 1.47; however, if perturber 106 is lowered to a distance of approximately 400 nm, $n_{eff}$ becomes approximately 1.483 resulting in change in $n_{eff}$ ($\Delta n_{eff}$) of approximately 0.0175.

This change in $n_{eff}$ as a function of perturber height can be used to dynamically control mode conversion between waveguides 102 and 104. Consider one embodiment in which waveguide 102 has width of 1.5 microns and waveguide 104 has a width of 6.5 microns. When perturber 106 is in a first position that distal with respect to waveguide 102, i.e. a perturber height of 800 nm or more, $n_{eff}$ is 1.464. However, under the control of controller 112, perturber 106 may be lowered to a desired height to cause a corresponding change in $n_{eff}$. Controller 112 may include a processor and memory storing a control program that references a table stored in memory within controller 112 that correlates perturber height to $n_{eff}$ for a given material and wavelength of light. Controller 112 may receive instructions to change the type of mode coupling that PIC 100 performs. For example, if controller 112 receives an instruction to change the output mode from TE$_2$ to TE$_1$, controller 112 causes perturber 106 to move to a new position where $n_{eff}$ enables allow for conversion from TE$_0$ to TE$_1$ polarization. This is illustrated in FIG. 4.

Figure 4:
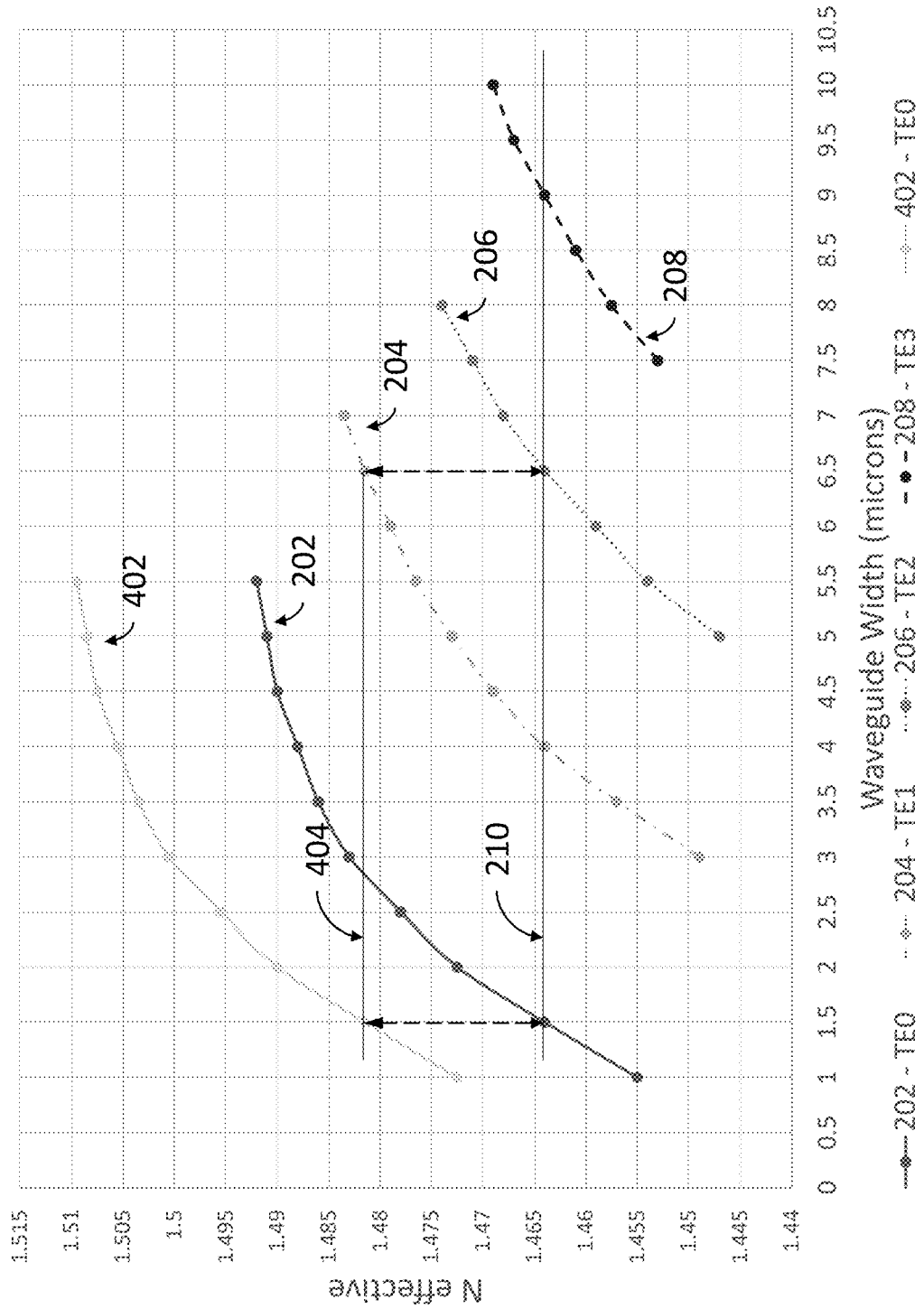
FIG. 4 is another plot of mode effective refractive index versus waveguide width.

FIG. 4 shows a plot 402 (corresponding to TE$_0$, the fundamental mode of light injected into waveguide 102) that has been shifted vertically due to a change in $n_{eff}$. More specifically, plot 202 has been shifted vertically by 0.0175 ($\Delta n_{eff}$) as a result of perturber 106 moving from the first (distal) position to a second (closer) position. When perturber 106 is in the first distal position, the TE$_0$ mode is converted into the TE$_2$ mode. However, by lowering the perturber 106 to the second closer position, the change in $n_{eff}$ causes the TE$_0$ mode to be converted to the TE$_1$ mode, as illustrated by line 404. Thus, by controlling the perturber height, controller 112 may dynamically change the type of mode conversion of performed by PIC 100.

Of course, as one of ordinary skill in the art will recognize, the examples illustrated in FIGS. 3 and 4 are merely exemplary. One may generate a plot of $n_{eff}$ to perturber height, like the plot shown in FIG. 3, for a waveguide of any suitable material, size, and dimension and store the same in controller 112 (or in a place accessible to controller 112) such that controller 112 may draw upon such data to determine an appropriate perturber height to effect a desired mode conversion. In a more simplistic implementation, if mode conversion is desired between two or more known modes, then perturber heights corresponding to those modes may be stored in controller 112, and controller 112 may draw upon the same information to effect a change in perturber height in response to an instruction (either from a user or from a processor executing a control program) to change the type of mode conversion. Although the above approach is described with reference to TE-polarization, it applies equally to TM-polarization. Thus, for brevity, a detailed description of mode conversion for TM-polarization light is omitted.

Returning to FIG. 1A, to limit the optical coupling to a defined length, the bend section 102B of waveguide 102 bends away from waveguide 104 such that the distance between the two waveguides increases to the point where optical coupling ceases. As one of ordinary skill will appreciate, the degree of the bend must not be so severe as to result in a substantial bend loss; in fact it is preferable to adiabatically (i.e. losslessly) bend the waveguide. The bend section 102B transitions into an output section 103A which is, in one embodiment, a fixed distance away from waveguide 104 in the x-direction, as shown in FIG. 1A. As one of ordinary skill will appreciate, the size of PIC 100 may be varied depending upon the application, however, the active area of PIC 100 depicted in FIG. 1A is approximately 0.1 mm×0.2 mm in an exemplary embodiment.

Figure 5B:
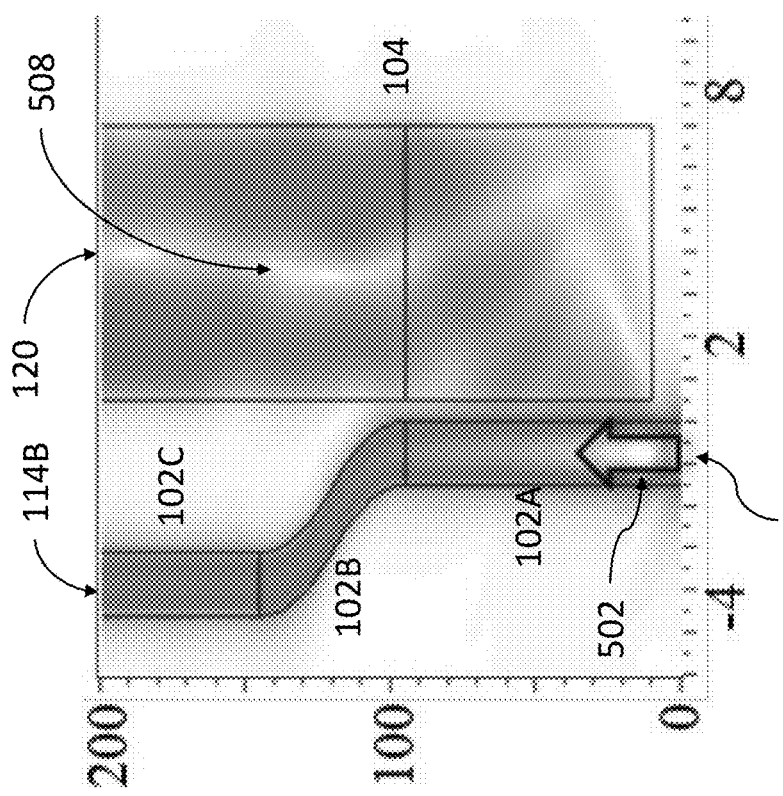
FIGS. 5A and 5B are plan views of light intensity within two waveguides in two different states.
Figure 5A:
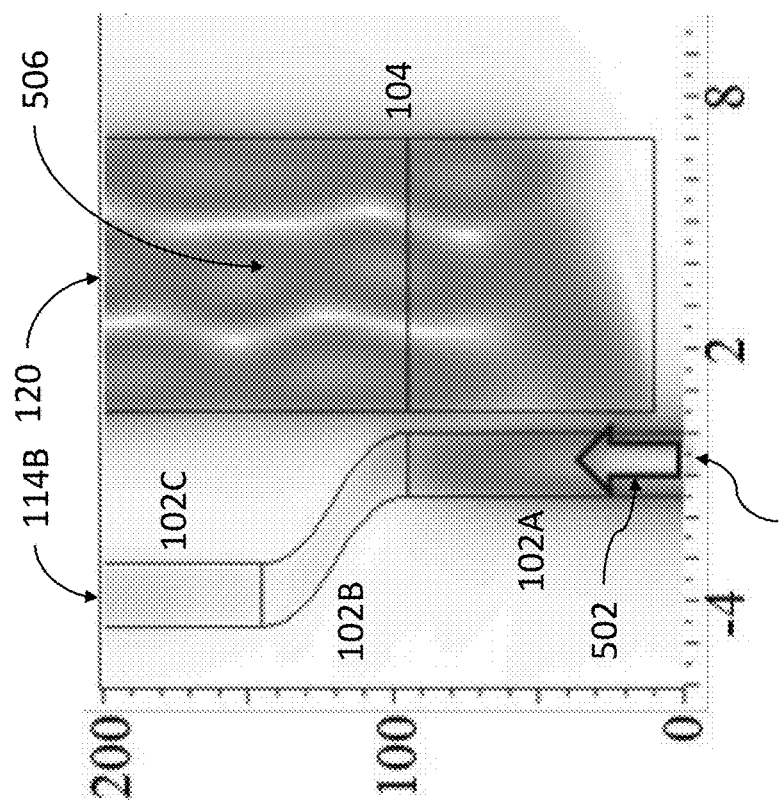
Figure 6B:
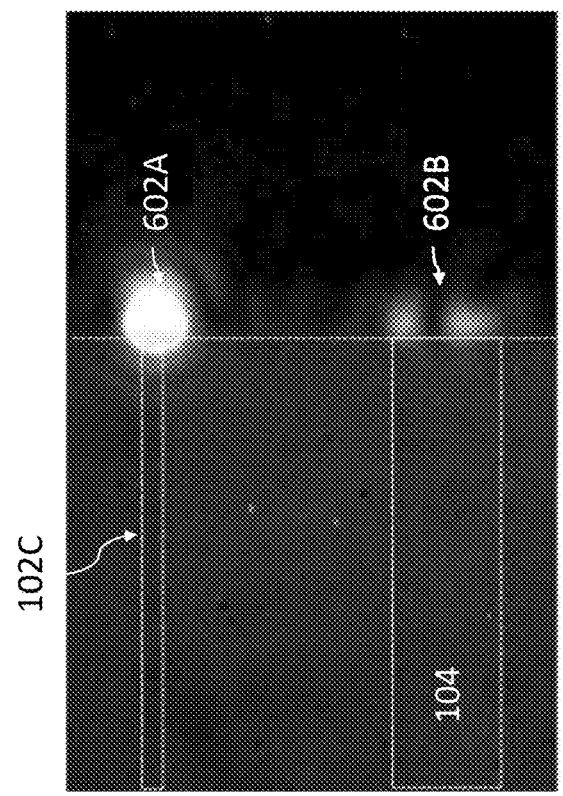
FIGS. 6A and 6B are images of the outputs of a photonic integrated circuit operating in two different states.
Figure 6A:
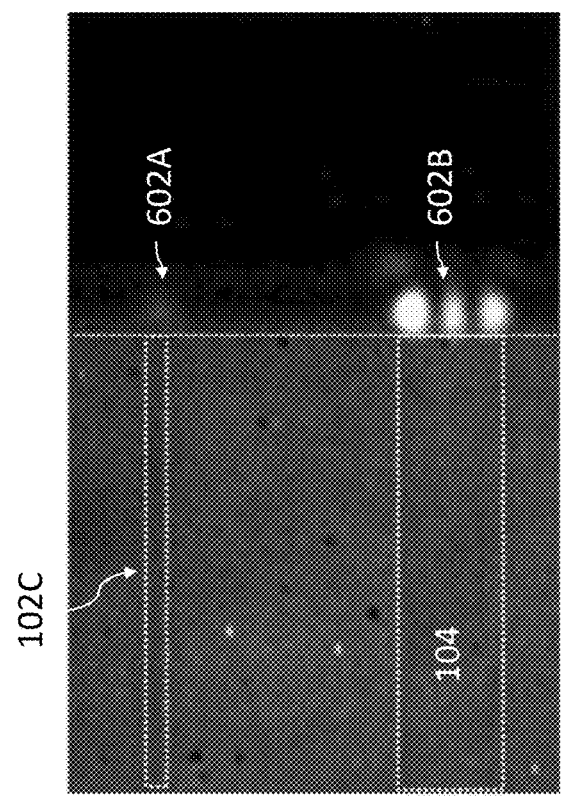

FIGS. 5A and 5B are plan views of light intensity within PIC 100 in a case where the perturber 106 is distal to the waveguide 102 and a case where the perturber 106 is moved closer to the waveguide 102, respectively. In the exemplary embodiment shown in FIGS. 5A and 5B, the width of waveguide 102 is 1.5 microns and the width of waveguide 104 is 6.5 microns. As shown in FIG. 5A, TE$_0$ mode light 502 is injected into the optical input 114A of waveguide 102. Per FIG. 2, TE$_2$ mode light 506 is generated in waveguide 104 and is outputted through optical output 120. FIG. 5B corresponds to a state where the perturber has been brought closer to the waveguide 102; specifically, by an amount that produces a change in $n_{\mathit{eff}}$ to change the mode conversion from $TE_2$ to $TE_1$ 508, as shown in FIG. 5B. FIGS. 6A and 6B respectively correspond to FIGS. 5A and 5B and are actual images of the output of waveguides 102 and 104 in a state where the perturber is distal from waveguide 102 and a state where perturber 104 is closer to waveguide 102, respectively. FIG. 6A confirms the conversion to $TE_2$ mode light in waveguide 104 when perturber 106 is distal from the surface of waveguide 102, and FIG. 6B confirms the conversion to $TE_1$ mode light in waveguide 104 when perturber 106 is correspondingly closer to waveguide 102.

As established above, PIC 100 is constructed to provide for conversion of an input fundamental mode of light ($TE_0$ or $TM_0$) to a two or more higher-order modes $TE_x$ or $TM_x$ based on the height of a perturber 106. Previous designs required multiple asymmetric couplers chained together to achieve the same functionality. Thus, the embodiments described above reduce the overall footprint needed to effect mode conversion but perhaps more important can be dynamically reconfigured without the need for cascading devices. PIC 100 also allows for continuous tuning and hence continuous adjustment of $n_{\mathit{eff}}$ to compensate for different wavelength inputted into PIC 100. Controller 112 may set the perturber height to be any value between 10-800 nm to produce a corresponding change in $n_{\mathit{eff}}$. Thus, as the wavelength of light inputted in waveguide 102 changes, controller 112 may correspondingly change the perturber height to maintain or change a desired mode conversion. This allows PIC 100 to function as a mode converter over a large wavelength range. As one of ordinary skill will appreciate, the precise wavelength range over which PIC 100 can function is dependent upon the materials, the geometry of the PIC 100, and the modes involved (TE and/or TM). But because of perturber 106, the range of wavelengths for PIC 100 is inherently larger than those of a conventional asymmetric coupler who dimensions are fixed the moment it is produced.

Another advantage of PIC 100 is that perturber 106 may be actuated by using electrostatic or gradient electric forces. Due to the small feature size of perturber 106 and thus the small size of the actuation electrodes, relatively large electric fields can be generated at reasonable voltages. Furthermore, the actuation does not consume any electrical power during steady-state operation, i.e. to hold perturber 106 at a given perturber height does not consume power even when the applied bias voltage is greater than zero. Furthermore, the power consumption during a period when the perturber height is being changed is estimated to be in the 10 pJ-range due to the small device capacitance, which is far less than thermo-optic tuning which consumes in the micro to milliwatt range. Another advantage over thermo-optic tuning is speed. Thermo-optic tuning is generally slow with response times in the 1 microsecond to 10 millisecond time frame. Electrostatic actuation, however, is not limited by thermal time constants and is only limited by the mechanical resonance frequency that sets the mechanical-temporal response. Since perturber 106 is thin (its thickness is much less than the wavelength of light injected into waveguide 102) and generally small (its overall length may be 100 microns or less), the fundamental mechanical resonance frequency can be in the range of 1-100 MHz which translates to a response time of 10 nanoseconds to 1 microsecond.

Finally, PIC 100 is relatively small and can be scaled up to a large number of devices on a chip. Multiple PICs 100 can be fabricated side-by-side using a single fabrication sequence enabling large cost savings to fabricating individual and discrete devices.

Figure 7A:
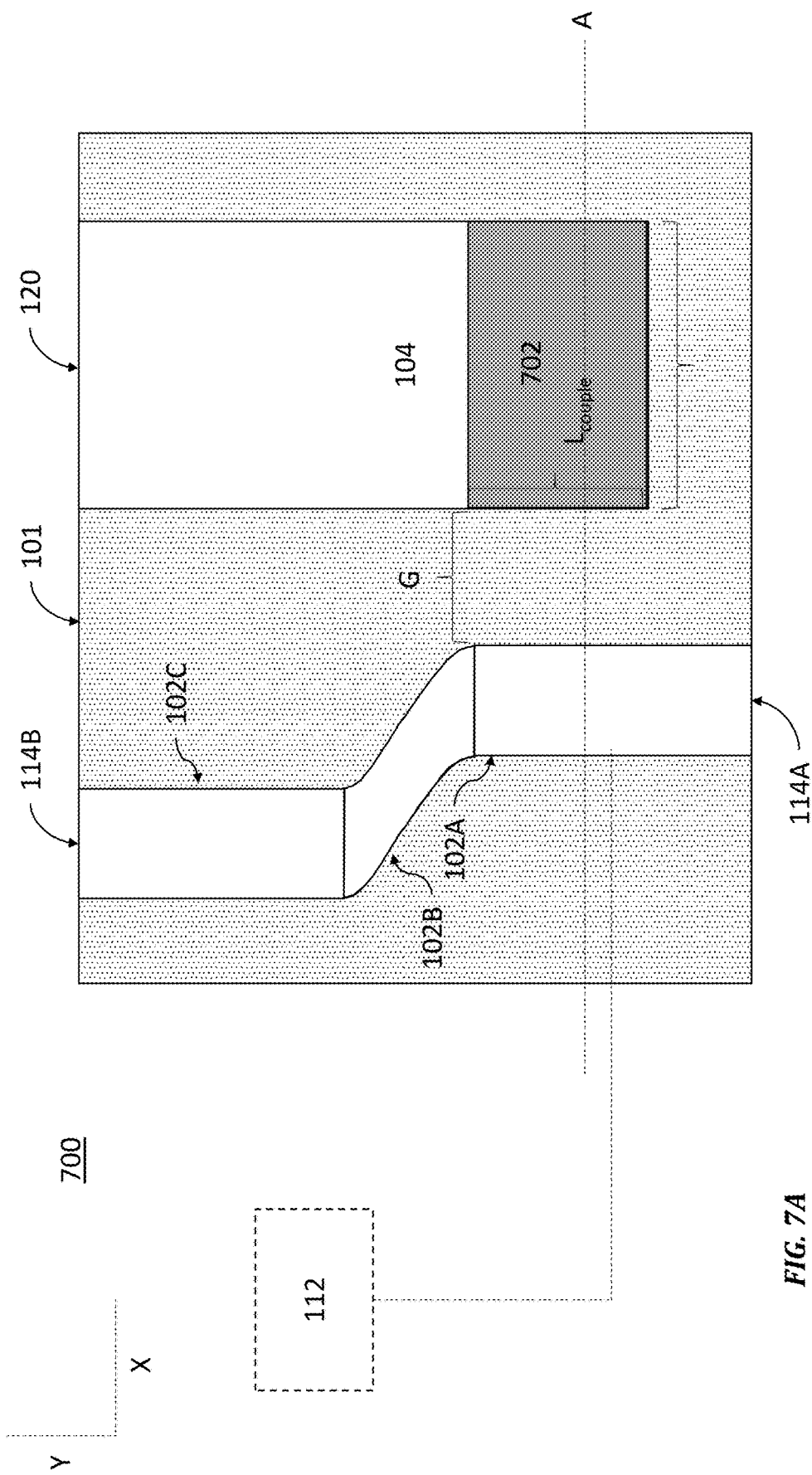
FIG. 7A is a plan schematic view of another PIC according to another embodiment.
Figure 7B:
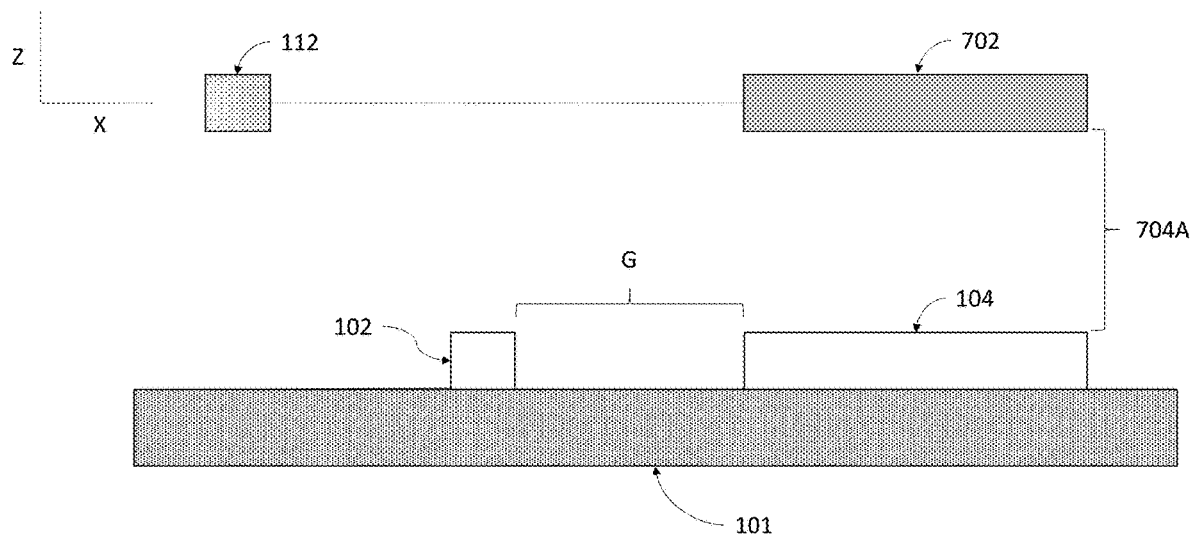
FIG. 7B is a cross-sectional of the view PIC shown in FIG. 7A in one operating state taken along the line A in FIG. 7A.
Figure 7C:
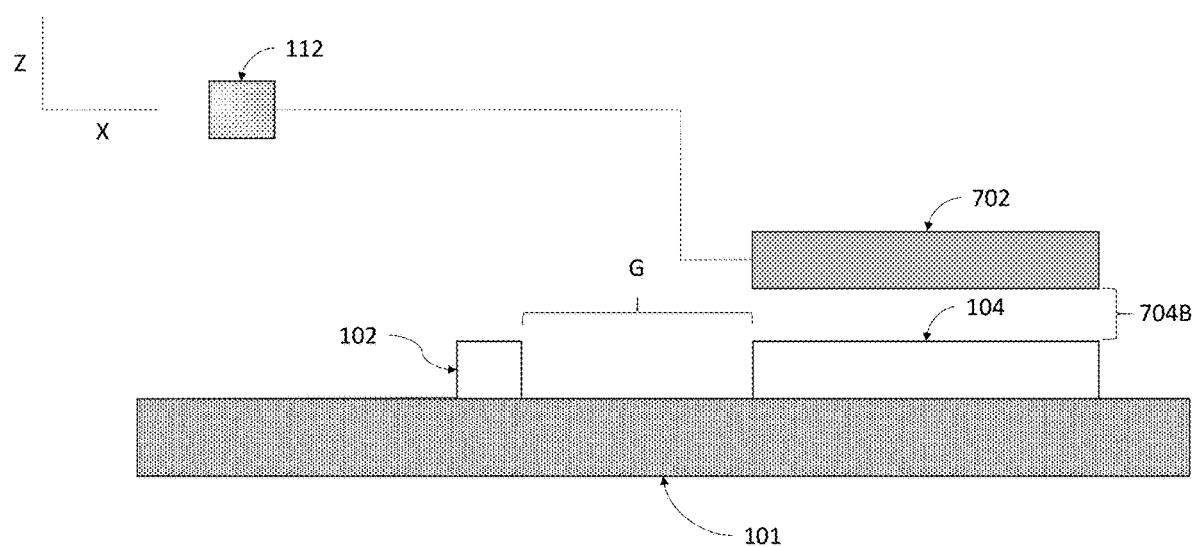
FIG. 7C is another cross-sectional of the view PIC shown in FIG. 7A in another operating state taken along the line A in FIG. 7A.

FIGS. 7A-C illustrate another PIC 700 according to another embodiment. PIC 700 is substantially the same as PIC 100, except that perturber 106 has been replaced with perturber 702 which is now disposed over waveguide 104 instead of waveguide 102. Perturber 702 is connected to controller 112 which, in this embodiment, is constructed to move perturber 702 through a range of perturber heights. It should be noted that the heights over which perturber 702 can be moved may be the same or different from those of perturber 106. When perturber 702 is distal with respect to waveguide 104, then (like above) perturber 702 has little effective on $n_{\mathit{eff}}$ of waveguide 104. However, by lowering perturber 702 towards a surface of waveguide 104, $n_{\mathit{eff}}$ of waveguide 104 increases correspondingly. By controlling the height of perturber 702, controller 112 may induce mode conversion within waveguide 104. This is illustrated in FIG. 8.

Figure 8:
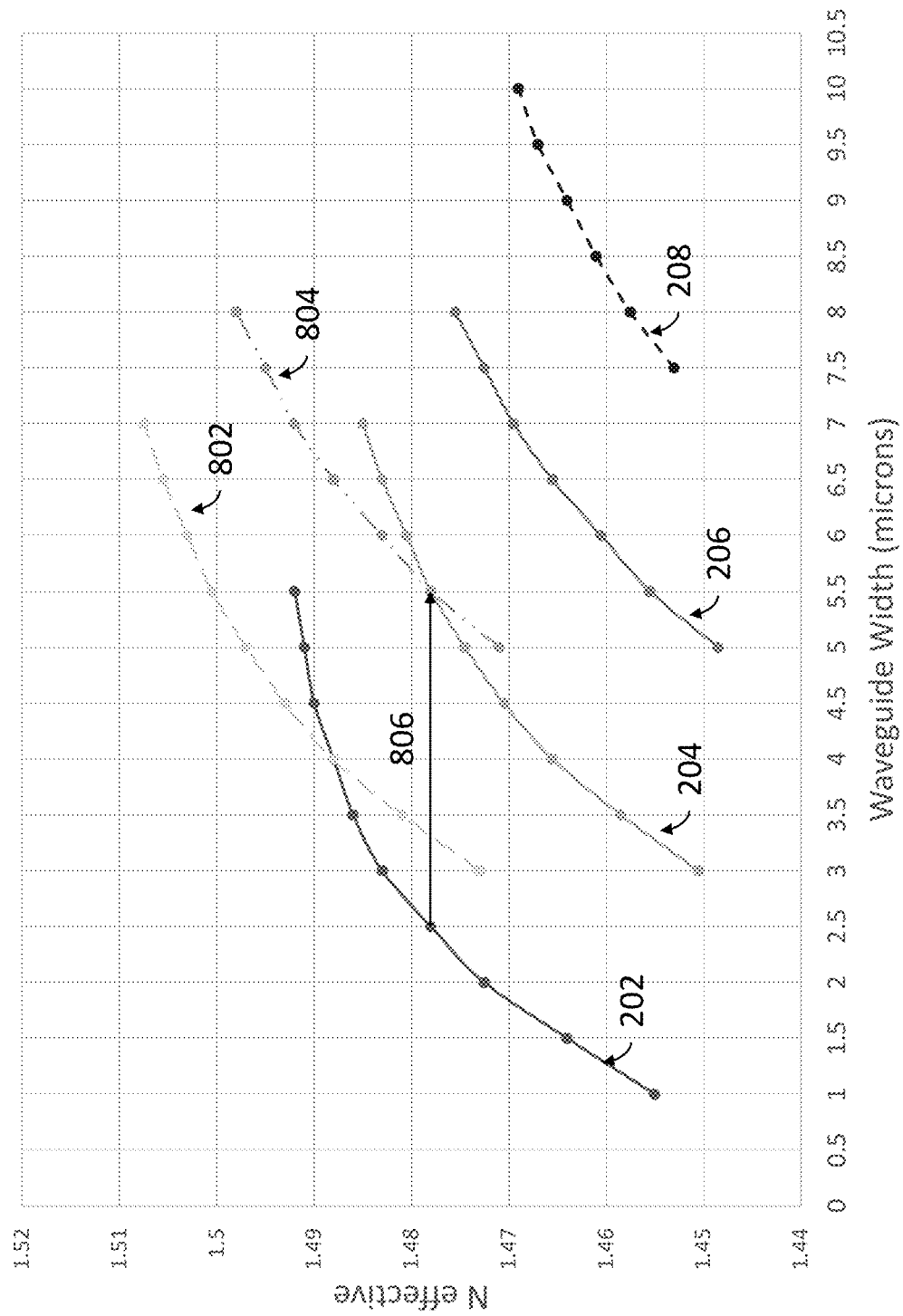
FIG. 8 is another plot of mode effective refractive index versus waveguide width.

FIG. 8 is similar to the same shown in FIG. 2, except the effect of perturber 702 is illustrated. If perturber 702 is distal from the surface of waveguide 104, then a fundamental mode injected into waveguide 102 will be converted to a $TE_1$ mode (or $TM_1$ as the case may be) mode in waveguide 104. However, if perturber 702 is lowered to a position corresponding to a change in $n_{\mathit{eff}}$ (of waveguide 104) of 0.0175, then the fundamental mode in waveguide 102 will be converted to a $TE_2$ mode in waveguide 104, as demonstrated by arrow 802. Consider an embodiment where waveguide 102 has a width of 2.5 microns and waveguide 104 has a width of 5.5 microns. When perturber 702 is distal from the surface of waveguide 104, $n_{\mathit{eff}}$ in both waveguides 102 and 104 is approximately 1.478. This results in a conversion from $TE_0$ to $TE_1$ as a horizontal line 806 located at $n_{\mathit{eff}}$ of 1.478 connects plot 202 (corresponding to $TE_0$) to 204 (corresponding to $TE_1$). However, by lowering perturber 702 $n_{\mathit{eff}}$ in waveguide 804 is increased. This can be illustrated as a vertical shift in plots 204 and 206 resulting in plots 802 and 804. It is noted that plot 208 is also shifted, but that is not show in FIG. 8 for sake of clarity. Since perturber 702 does not result in a substantial change in $n_{\mathit{eff}}$ in waveguide 702, plot 202 is not shifted vertically. The vertical shift in plot 204 means that mode conversion from $TE_0$ to $TE_1$ is no longer possible, as $n_{\mathit{eff}}$ would have to be raised in waveguide 102 to establish a phase matching condition. However, a vertical shift of 0.0225 ($\Delta n_{\mathit{eff}}$) creates a new phase matching condition. This is illustrated in FIG. 8 by the same horizontal line 806 which now intersects plot 804 (corresponding to a shifted $TE_2$ plot). Thus, when perturber 702 is lowered by a certain amount, mode conversion from $TE_0$ to $TE_1$ is replaced by mode conversion from $TE_0$ to $TE_2$.

Figure 9A:
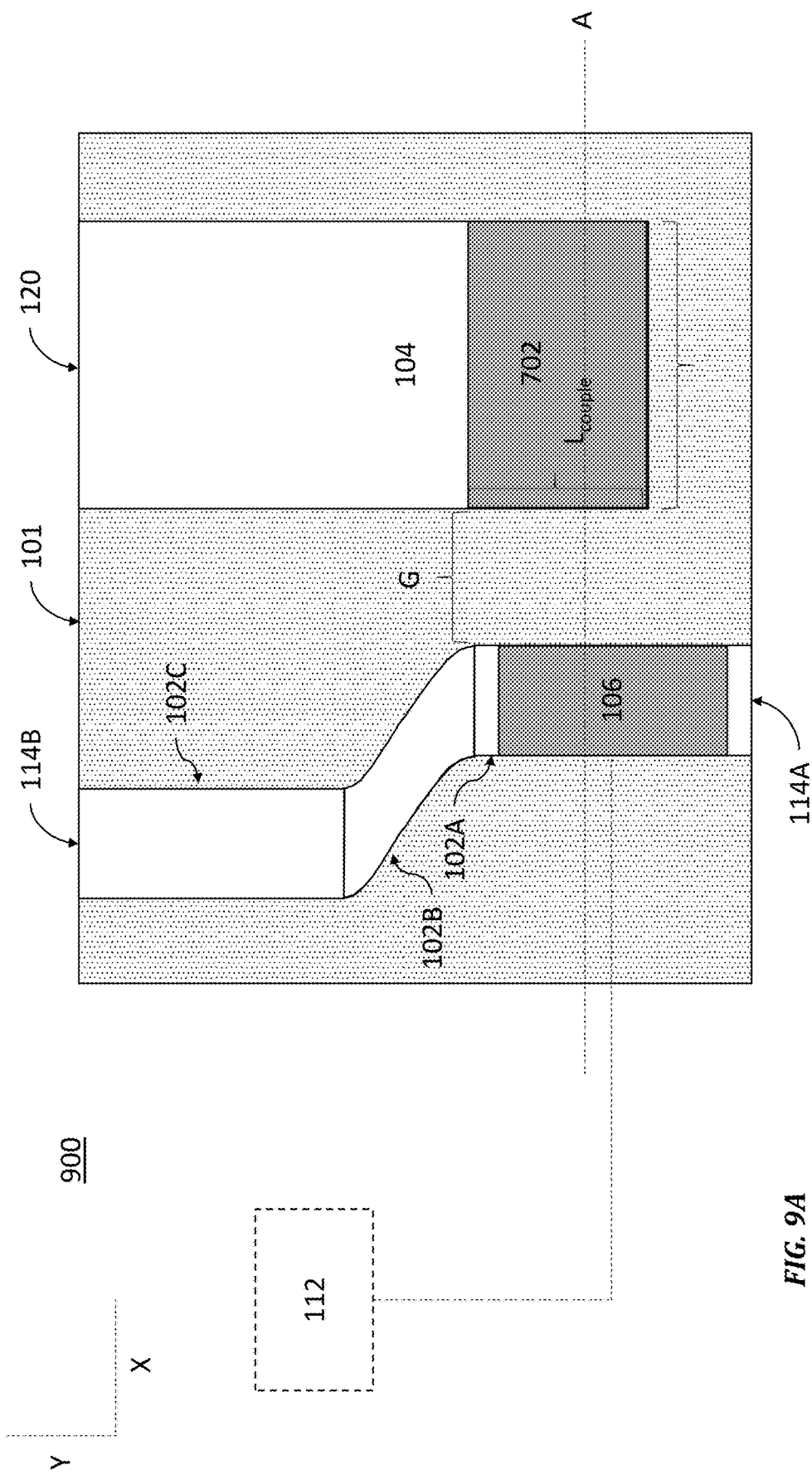
FIG. 9A is a plan schematic view of yet another PIC according to another embodiment.
Figure 9B:
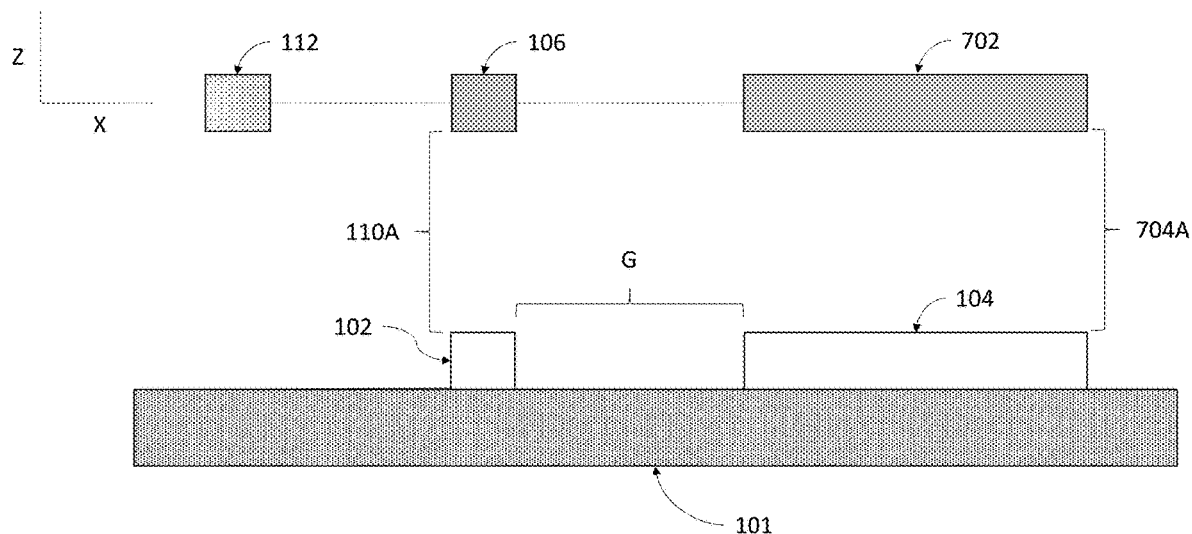
FIG. 9B is a cross-sectional of the view PIC shown in FIG. 9A in one operating state taken along the line A in FIG. 9A.
Figure 9C:
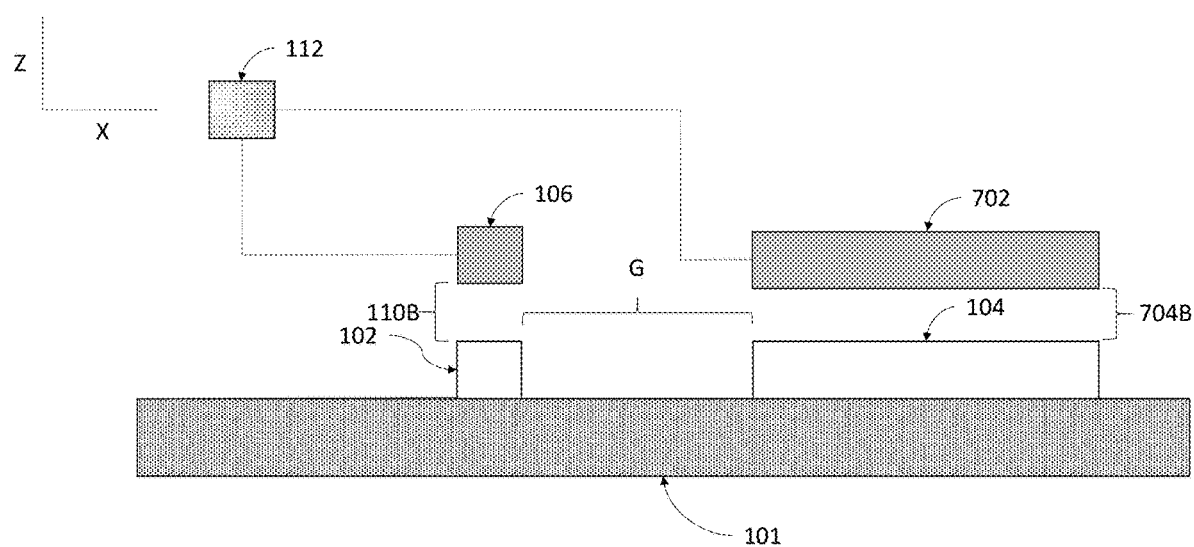
FIG. 9C is another cross-sectional of the view PIC shown in FIG. 9A in another operating state taken along the line A in FIG. 9A.

FIGS. 9A-C illustrate yet another embodiment of a PIC 900. In the embodiment shown in FIGS. 9A-C, perturber 106 and perturber 702 are both provided over waveguides 102 and 104, respectively. Controller 112 is constructed to change the perturber heights of perturbers 106 and 702. As discussed above, lowering the height of perturber 106 result in a change in mode conversion from $TE_2$ to $TE_1$, and lowering the height of perturber 702 result in a change in mode conversion from $TE_1$ to $TE_2$. Thus, by controlling the perturber heights of perturbers 106 and 702, it is possible to enable coupling to any mode, both higher and lower order.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus, comprising:
    a substrate;
    a first waveguide formed on the substrate that includes:
        (i) an input section,
        (ii) a bend section, and
        (iii) an output section;
    a second waveguide formed on the substrate and disposed adjacent to a portion of the input section of the first waveguide wherein a portion of the second waveguide is separated from the input section of the first waveguide by a coupling gap;
    a perturber disposed above the first waveguide and configured to move between a first position that is distal from a surface of the input section of the first waveguide and a second position that is closer to the surface of the input section of the first waveguide than the first position; and
    a controller configured to control a movement of the perturber between the first position and the second position,
    wherein when the perturber is in the first position a mode effective refractive index of the first waveguide is lower than the mode effective refractive index of the first waveguide when the perturber is in the second position; and
    wherein the controller is configured to move the perturber to a different position based on a change in a wavelength of light injected into the input section.

2. The apparatus of claim 1, wherein the input section is constructed to receive light of different wavelengths.

3. The apparatus of claim 1, wherein the perturber is moved by at least one thermal actuator.

4. The apparatus of claim 1, wherein the perturber is moved by electrostatic actuation.

5. A method of converting a mode of light, comprising the steps of:
    receiving, at a controller, an instruction to output light of a particular waveguide mode;
    causing a perturber disposed above an input section of a first waveguide, provided on a substrate, to move to a position above the first waveguide so as to set a mode effective refractive index of the first waveguide;
    receiving, at the input section of the first waveguide, light with a fundamental polarization mode; and
    outputting, from a second waveguide formed on the substrate and disposed adjacent to a portion of the input section of the first waveguide such that a portion of the second waveguide is separated from the input section of the first waveguide by a coupling gap that allows optical coupling between the first waveguide and the second waveguide, light with a higher order polarization mode corresponding to a height of the perturber above the input section of the first waveguide.

* * * * *